United States Patent [19]

Lee

[11] Patent Number: 5,311,381
[45] Date of Patent: May 10, 1994

[54] METHOD AND APPARATUS OF AUTOMATICALLY TRACKING A RECORDING MEDIUM

[75] Inventor: Taek-Ho Lee, Ahnyang, Rep. of Korea

[73] Assignee: Samsung Electronics Co. Ltd., Suwon, Rep. of Korea

[21] Appl. No.: 796,607

[22] Filed: Nov. 22, 1991

[30] Foreign Application Priority Data

Feb. 13, 1991 [KR] Rep. of Korea ............... 1991-2399

[51] Int. Cl.⁵ .................. G11B 5/584; G11B 5/596
[52] U.S. Cl. ..................... 360/77.13; 360/77.01; 360/77.06
[58] Field of Search ............ 360/77.01, 77.04, 77.06, 360/72.2, 77.13, 77.16, 77.17, 78.13, 78.14; 369/44.34, 44.32, 44.25, 44.35, 44.29, 54

[56] References Cited

U.S. PATENT DOCUMENTS

4,777,543 10/1988 Nishijima et al. ............ 360/77.13

Primary Examiner—Andrew L. Sniezek
Assistant Examiner—Varsha V. Sheladia
Attorney, Agent, or Firm—Robert E. Bushnell

[57] ABSTRACT

An automatic tracking method for detecting an optimized, accurate tracking level in a video tape recorder system to automatically sustain picture quality monitors a variation of the tracking level to continually detect a highest tracking level. Tracking data corresponding to the highest tracking level is set as output tracking data, to continually sustain optimized tracking.

13 Claims, 9 Drawing Sheets

METHOD AND APPARATUS OF AUTOMATICALLY TRACKING A RECORDING MEDIUM

BACKGROUND OF THE INVENTION

This invention relates to an automatic tracking control method in a video tape recorder and particularly although not exclusively to a method for continually sustaining an optimized tracking level by monitoring the tracking levels.

Figure 1:
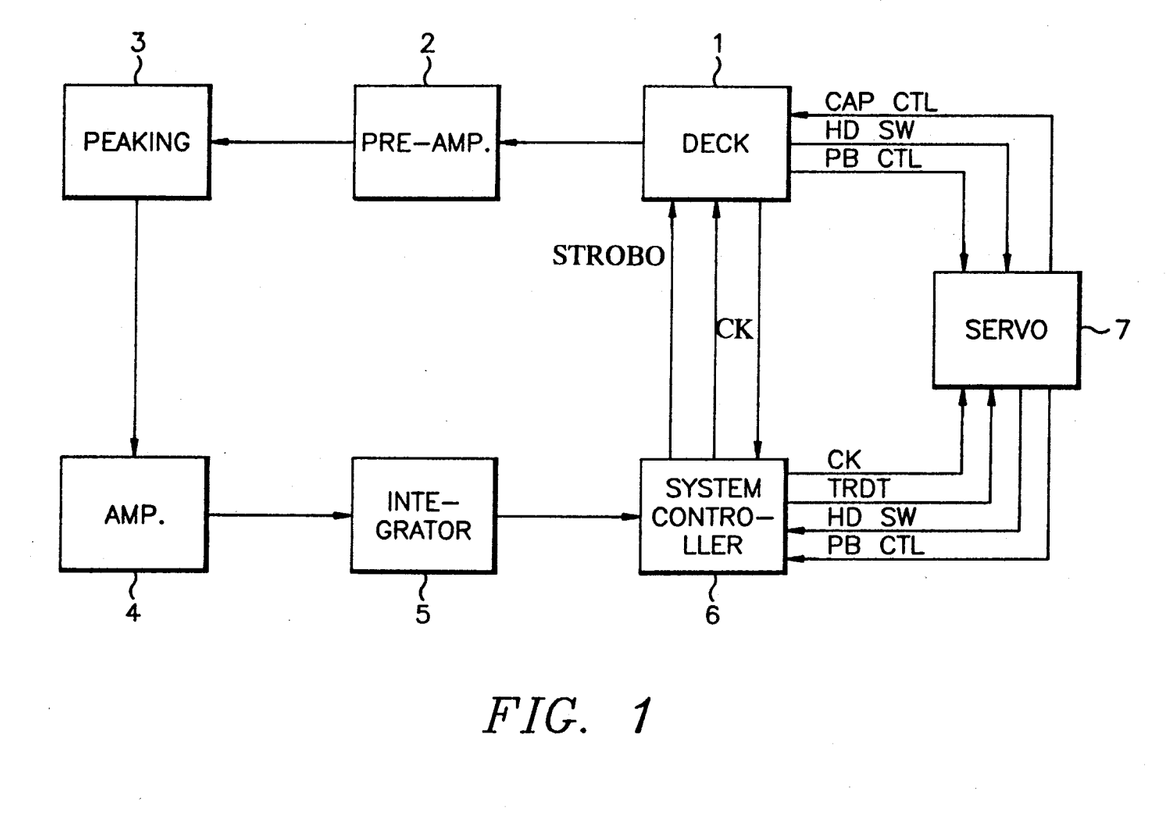
FIG. 1 shows a block diagram of a general tracking control device in a videotape recorder system to which the present invention is applied.
Figure 2A:
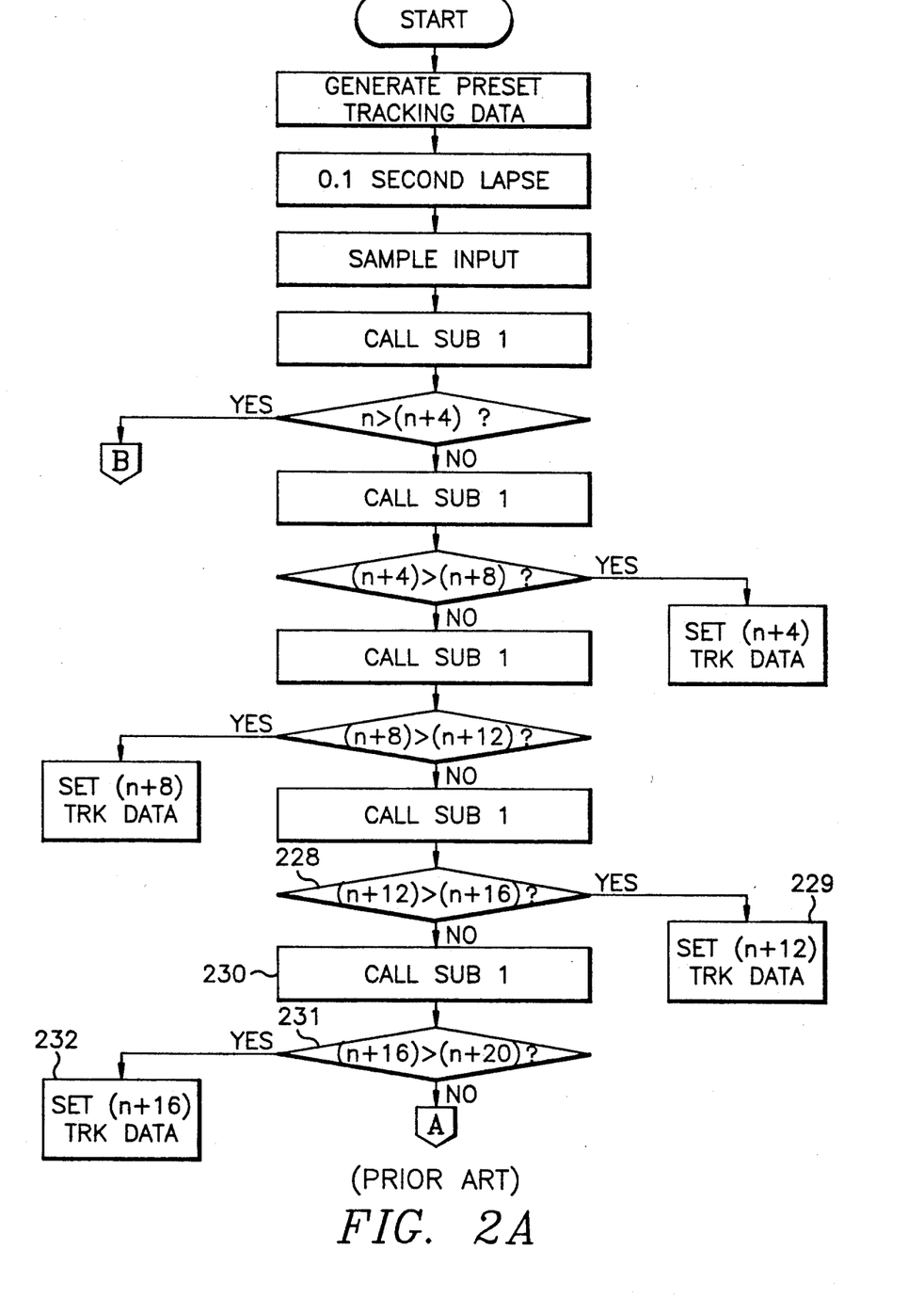
FIGS. 2A to 2D show flow charts of a conventional automatic tracking method.
Figure 2B:
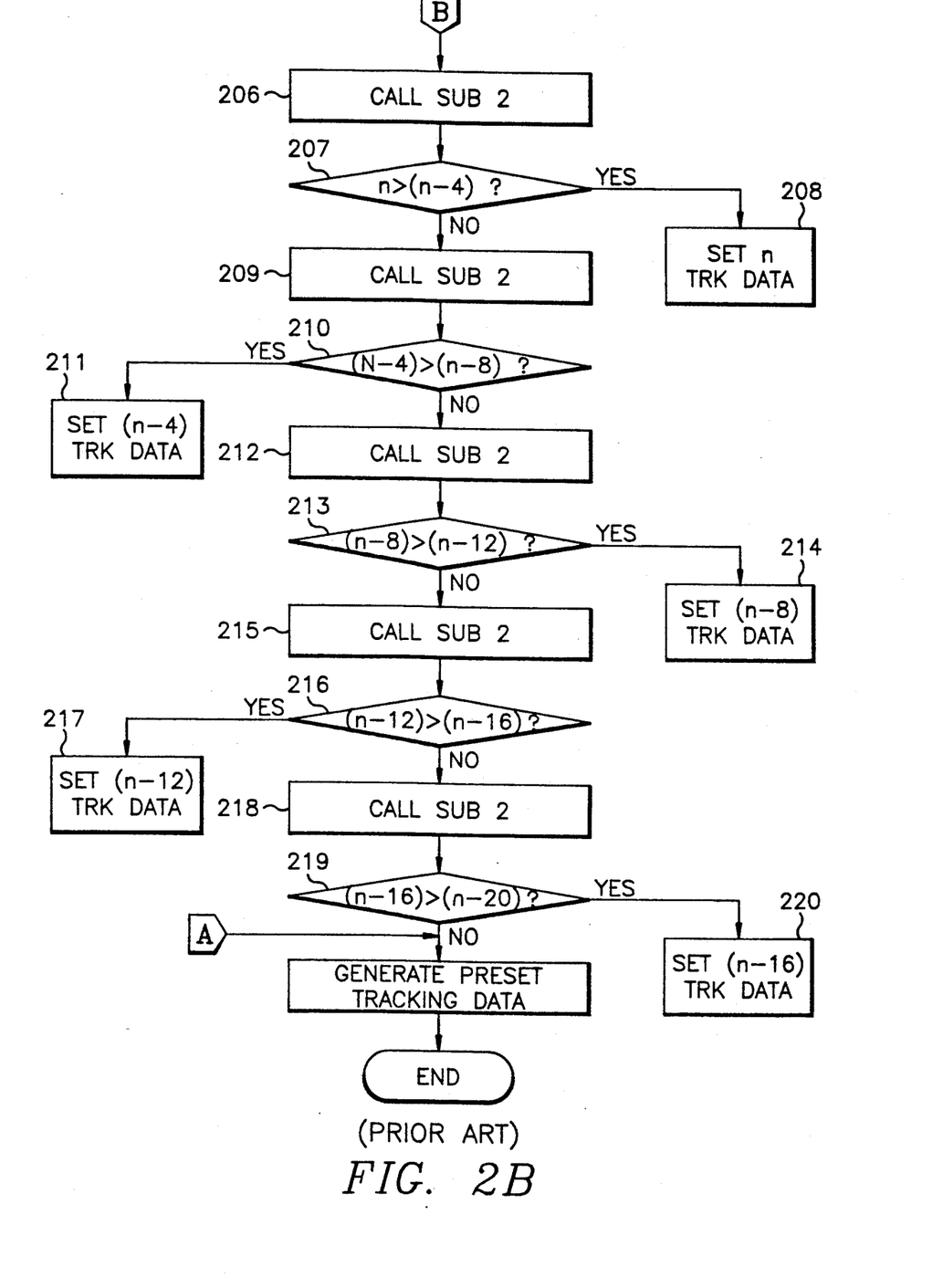
Figure 2C:
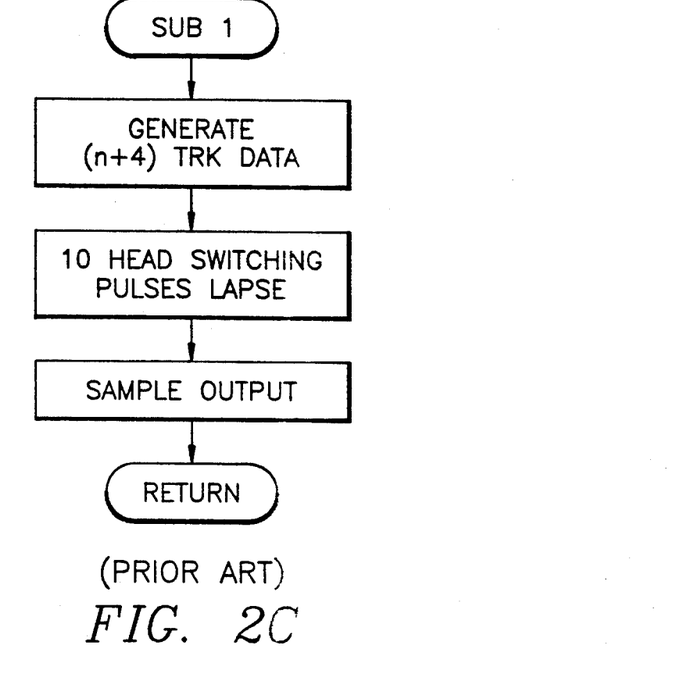
Figure 2D:
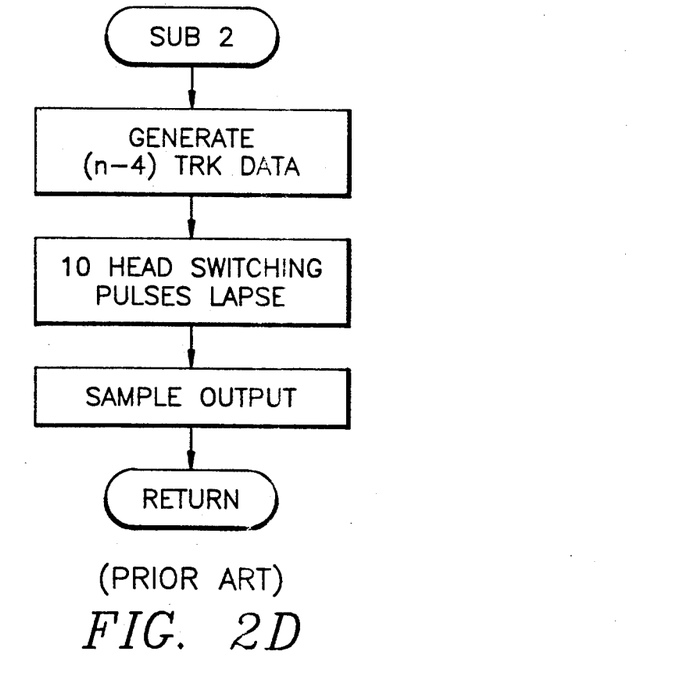

In FIG. 1, a block diagram of a general tracking control device in a video tape recorder system is schematically illustrated, wherein a program contained in a system controller 6 generates tracking data TRDT to a servo 7 and then, the servo 7 provides a deck 1 with a capstan control signal CAP-CTL in accordance with the tracking data TRDT, to control a rotational speed of a capstan. Then, a head in the deck 1 picks up an instataneous tracking level indicative of a current tracking state according to the rotational speed of the capstan and provides the instantaneous tracking level to the system controller 6, to sustain an optimized tracking level by comparing instantaneous tracking levels.

FIGS. 2A to 2D, disclose a conventional automatic tracking method performed by the videotape recorder system of FIG. 1 as in Korean Patent application No. 89-19419. According to the conventional method, the system controller 6 having an analog-to-digital converter therein executes the automatic tracking as shown in FIGS. 2A to 2D. However, when such an automatic tracking method is employed, in some occasions the system controller 6 may misrecognize variation valves of the instantaneous tracking levels picked up by the head and/or may result in a mal-operation because the automatic tracking operation depends simply on a comparison of the instantaneous tracking levels by means of the system controller 6. Therefore, occasionally, a noisy video signal may be misrecognized for a nose-free video signal particularly when a worn-out video tape is used, and thus the optomized tracking level may be miscalculated, thereby resulting in deteriorated automatic tracking.

SUMMARY OF THE INVENTION

It is accordingly an object of the present invention to provide a method for detecting an optimized, accurate tracking level in a videotape recorder system to automatically sustain picture quality.

It is another object of the present invention to provide an automatic tracking method for continually sustaining a good picture quality in a videotape recorder system, regardless of the condition of a video tape quality.

According to one aspect of the present invention, an automation tracking method comprises the steps of: generating a plurality of first tracking data sets each having corresponding digital tracking level values to be stored in a memory, and determining whether the digital tracking levels are steadily increasing, to monitor variation of the digital tracking level values; if the digital tracking levels are steadily increasing, increasing repeatedly the tracking data by predetermined steps each having corresponding digital tracking levels to be stored in the memory, and comparing a current tracking level value with a preceding tracking level value, to set the tracking data corresponding to the preceding tracking level value for output tracking data if the current digital tracking level value is lower than the preceding tracking level value; if the digital tracking levels are not steadily increasing in the first tracking data generation step, generating a plurality of second tracking data sets each having corresponding digital tracking levels to be stored in a memory, and determining whether the digital tracking level values are steadily increasing, to monitor variation of the digital tracking level values; if the digital tracking levels are steadily increasing in the second tracking data generation step, decreasing repeatedly the tracking data by the predetermined steps each having corresponding digital tracking levels to be stored in the memory, and comparing the current tracking level value with the preceding tracking level value, to set the tracking data corresponding to the preceding tracking level value for the output tracking data if the current digital tracking level value is lower than the preceding tracking level value; and if the digital tracking levels are not steadily increasing in the second tracking data generation step, comparing entire tracking level values stored in the memory in the preceding steps to detect a highest tracking level value and corresponding tracking data, the detected tracking data being set as output tracking data.

BRIEF DESCRIPTION OF THE ACCOMPANYING DRAWINGS

For a better understanding of the invention and to show how the same may be carried into effect, reference will now be made by way of example to the accompanying diagrammatic drawings, in which.

DETAILED DESCRIPTION OF THE PREFERRED EMBODIMENT

With reference to FIGS. 3A to 3D, in steps 301 through 306, n (present tracking data), (n+4), (n+8), (n+12, and (n+16) tracking data are sequentially generated by the system controller 6. For each tracking data, tracking level values $S_1$, $S_2$, $S_3$, $S_4$, and $S_5$ (See FIG. 4) are consequently stored in a memory after the lapse of 0.1 second, each time. Then, whether the tracking level values are in the order of $S_1 < S_2 < S_3 < S_4 < S_5$ is checked, to detect a variation of the tracking levels.

If the tracking levels are increasing such as $S_1 < S_2 < S_3 < S_4 < S_5$, the tracking data are also increased by the system controller 6 by (n+4k), where k=5, 6, 7, ..., 20, and then a current tracking level is detected and compared with a preceding tracking level; as a result, if the current tracking level is lower than the preceding tracking level, then the preceding tracking data is set as output tracking data (See steps 308 through 319).

However, if the tracking level values decrease such as $S_1 < S_2 > S_3 > S_4 > S_5$ in the step 307, then (n−4), (n−8), (n−12), and (n−16) tracking data are generated in sequence. For each tracking data, the tracking level values $S_6$, $S_7$, $S_8$, and $S_9$ are stored in the memory after the lapse of 0.1 second, each time. Thereafter, whether $S_6<S_7<S_8<S_9$ is checked, to detect a variation of the tracking levels (See steps 320 through 326).

Thereafter, if the tracking level increases such as $S_6<S_7<S_8<S_9$, the tracking data are decreased by the system controller 6 by (n−4k), where k=5, 6, 7, ..., 20, and then the current tracking level is compared with a preceding tracking level; as a result, if the current tracking level is lower than the preceding tracking level, the preceding tracking data is set as the output tracking data (See steps 327 through 339').

If the tracking level values decrease such as $S_6>S_7>S_8>S_9$ in the step 326, then the highest tracking level of the tracking level values $S_1$ through $S_9$ from memory is set as the output tracking data (See the steps 339 and 340).

Figure 4:
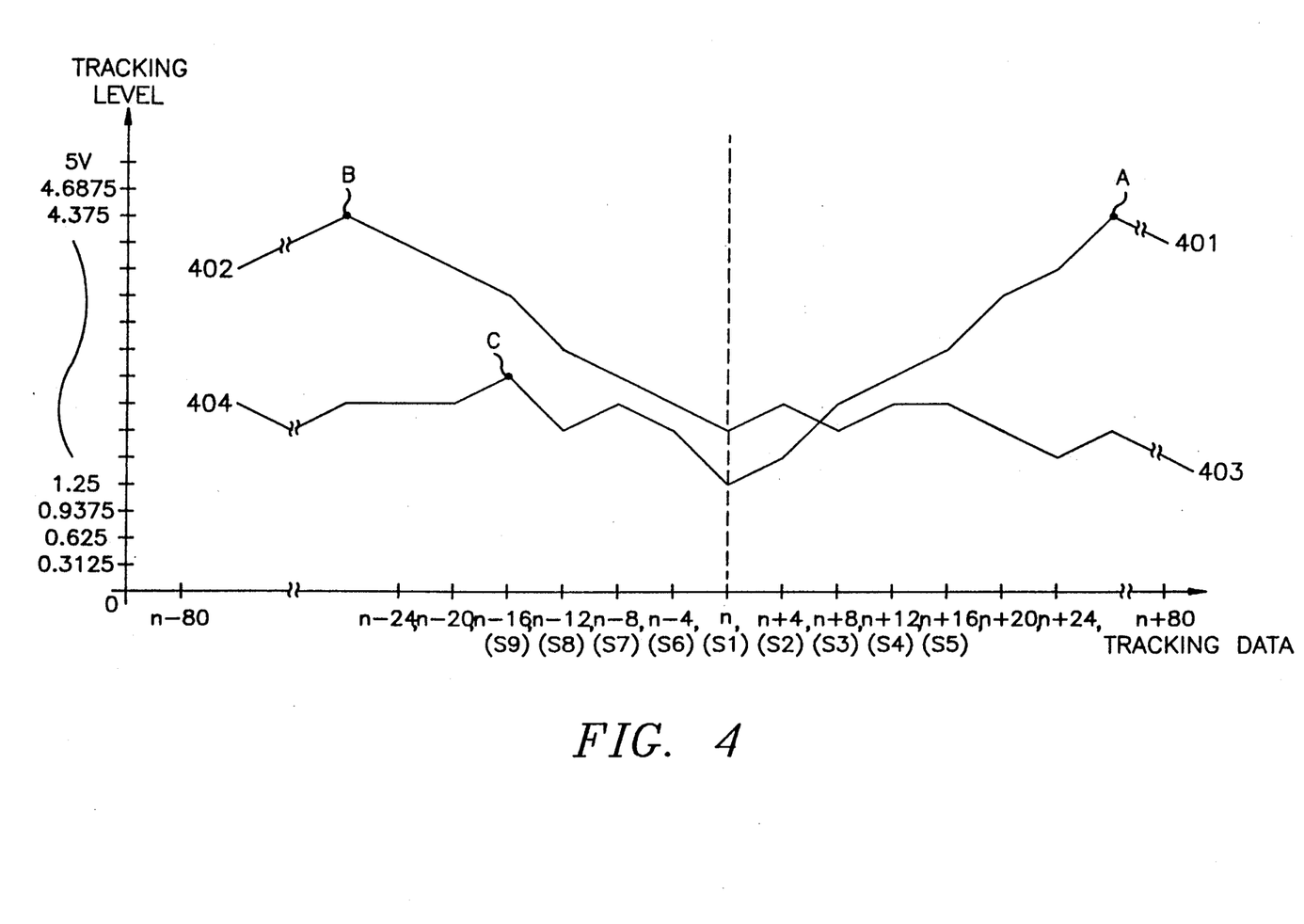
FIG. 4 shows tracking level curves with respect to the tracking data according to the present invention.

Referring to FIG. 4, which shows tracking level values with respect to tracking data, a reference "A" represents the highest tracking level value, detected during the steps 308 through 319; a reference "B" represents the highest tracking level value, detected during the steps 327 through 339'; and a reference "C" represents the highest tracking level value, detected during the steps 339 through 340.

Referring back to FIGS. 1 to 4, operation of an embodiment according to the present invention will now be described in detail.

Figure 3A:
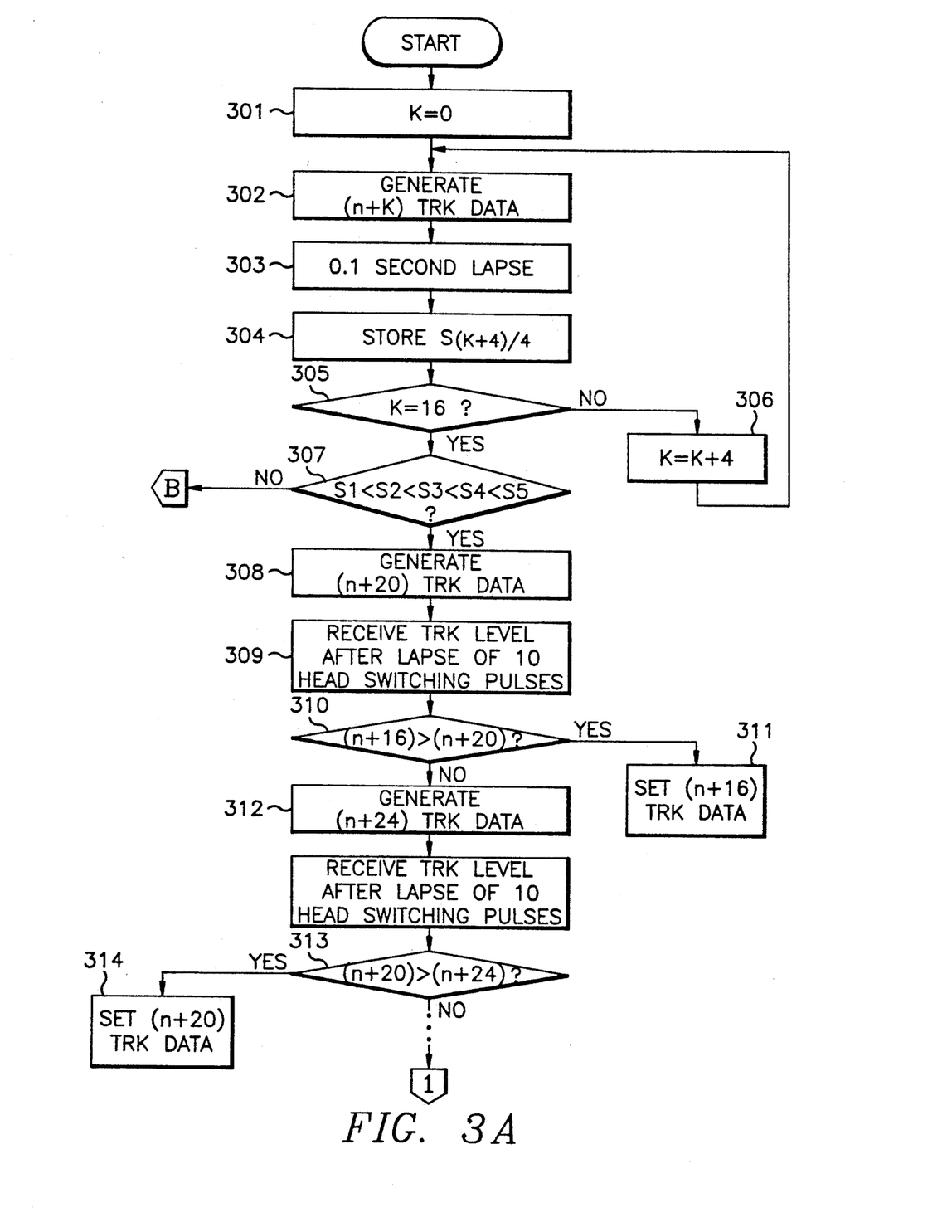
FIGS. 3A to 3D show flow charts of an automatic tracking method according to the present invention.

With respect to the steps 301 to 306, the system controller 6 sets a variable k to zero in the step 301, and generates n+k initial preset tracking data in the step 302. In this case, the n+k (=n, since k=0) preset tracking data is supplied to the servo 7 together with a clock CK. Then, the servo 7 generates a capstan control signal CAP-CTL to the deck 1 according to the tracking data to control the capstan. As a result, the capstan in the deck 1 rotates to run a tape and at the same time a signal is read from the tape. Being very weak, this signal is preliminarily amplified by a preamplifier 2. Of various signals, the only signals required for tracking control are selected by the peaking process and amplified, up to or over 1 V, by an amplifier 4. The amplified signals are integrated by the integrator 5. The integrated signals become the tracking level and are applied to the analog-to-digital converter in the system controller 6, to generate a digital tracking level value $S_1$ (k=0; $S_{(4+k)/4}=S_1$).

That is, 0.1 second after the generation of n tracking data in step 302, the system controller 6 stores the tracking level value $S_1$ into memory. Consecutively, the system controller 6 checks whether the variable k is equal to 16 in step 305. In this case, however, since the variable k is zero, the system controller 6 proceeds to the step 306.

The system controller 6 then generates next n+k tracking dta and after the lapse of 0.1 second, stores in memory the tracking level value $S_2$ (k=4; $S_{(4+k)/4}=S_2$) for the n+4 tracking data.

In the above way, the system controller 6 repeats the steps 302 through 306 to generate the digital tracking level values $S_1$, $S_2$, $S_3$, $S_4$, $S_5$ for the respective n, n+4, n+8, n+12, n+16 tracking data, the above digital tracking level values being stored in the memory sequentially. When the variable k reaches sixteen (i.e., k=16), the system controller 6 will proceed to step 307 and analyze the tracking level values $S_1$, $S_2$, $S_3$, $S_4$, $S_5$ to determine whether they are in the order of $S_1<S_2<S_3<S_4<S_5$. If the tracking level values are increasing as such, the system controller 6 proceeds to the step 308.

During the steps 308 through 319, if the tracking level values for the respective tracking data increasing sequentially by four steps are decreased at a certain point as shown with reference to a curve 401 of FIG. 4, the system controller 6 determines, a tracking data preceding a current tracking data as a highest tracking level valve. This procedure has been expanded and improved over the prior art so that the tracking level may be more precisely determined.

Figure 3B:
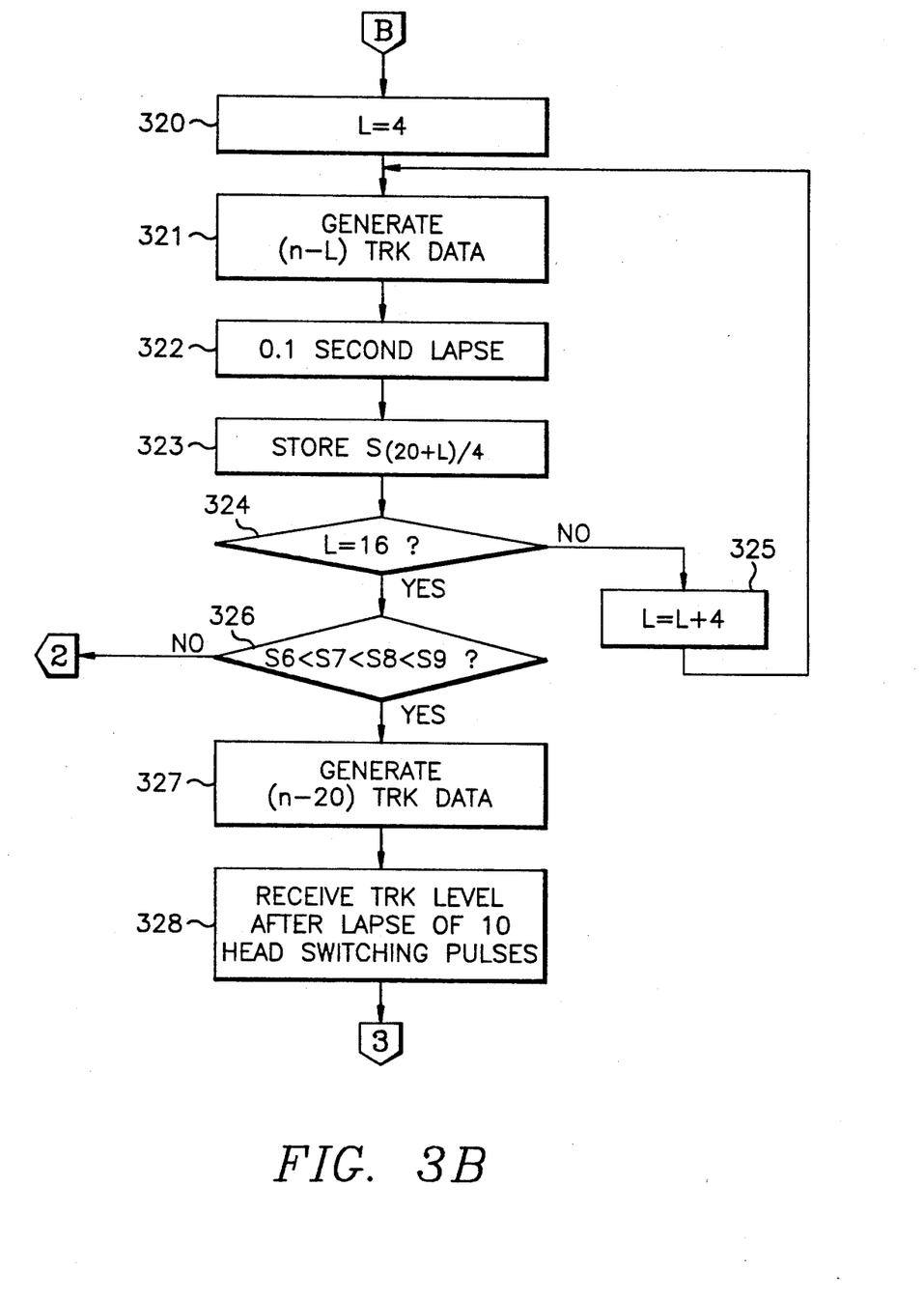
Figure 3C:
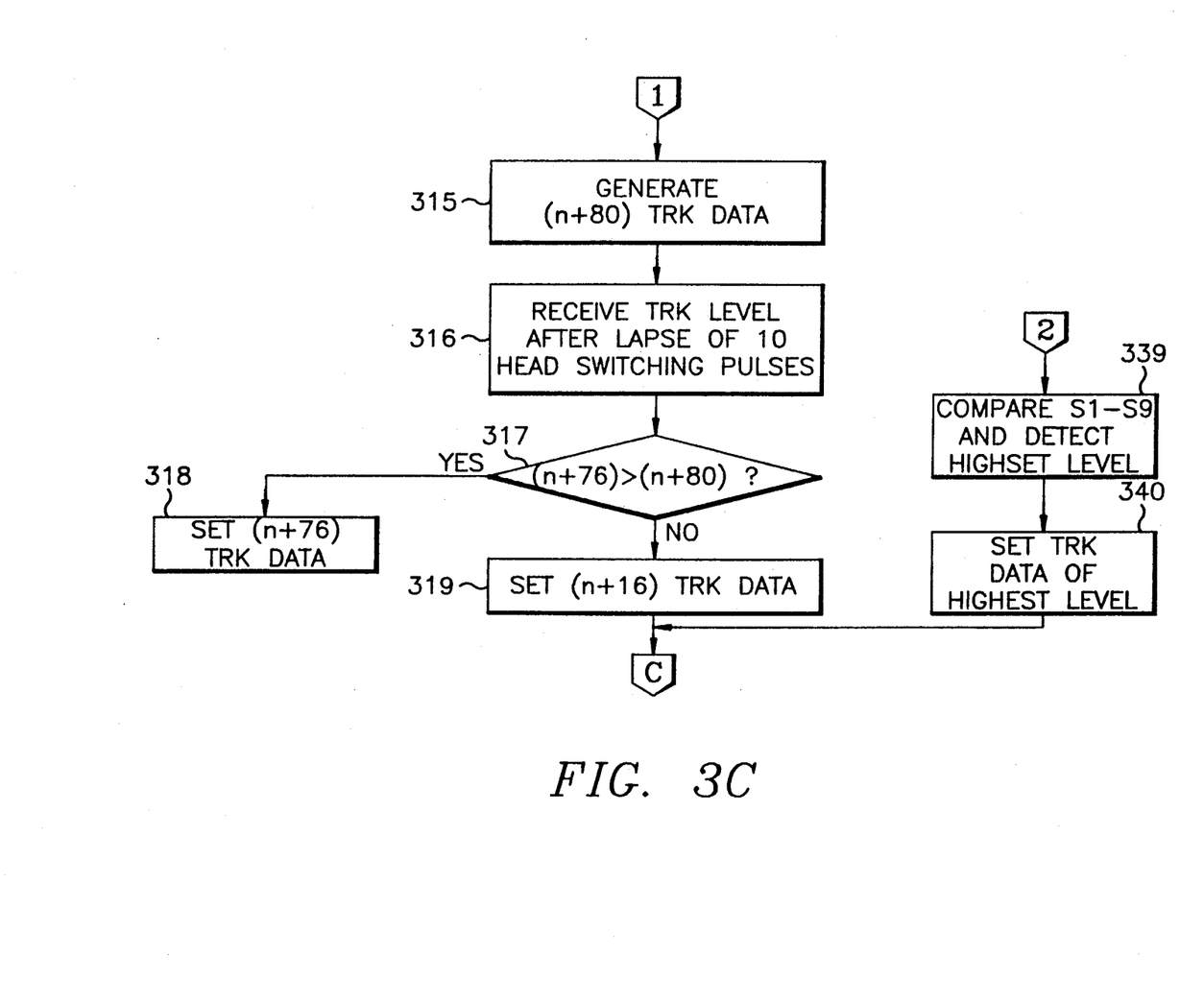

In the step 307, if the tracking level values are not increasing, then the system controller 6 proceeds to step 320 and sets a variable L to four (i.e., L=4). The system controller 6 generates n−L (i.e., n−4) tracking data in step 321 and stores in memory a digital tracking level value $S_{(20+L)/4}$ (i.e., $S_6$) for the digital tracking data n−4, in step 323. In practice, the tracking level value $S_6$ is produced such that a tracking envelope signal output from the head in the deck 1 is processed through the preamplifier 2, peaking circuit 3, amplifier 4, integrator 5, and analog-to-digital converter in the system controller 6. Thereafter, whether the variable L is equal to sixteen (i.e., L=16) is checked in step 324; as a result, if the variable L is not equal to sixteen, the system controller 6 proceeds to the step 325, to increase the variable L by four and to repeat the above steps 321 to 324. In this way, the system controller 6 generates n−4, n−8, n−12 and n−16 tracking data and stores the digital tracking level values $S_6$, $S_7$, $S_8$ and $S_9$ for the above respective tracking data. If the tracking level values are in the order of $S_6<S_7<S_8<S_9$, the system controller 6 proceeds to step 327.

In steps 327 to 339', if the tracking level values for the respective tracking data decreasing sequentially by four steps are decreased at a certain point as shown with reference to a curve 402 of FIG. 4, the system controller 6 determines the tracking data preceding the current tracking level value as the highest tracking level value. In this way, the system controller 6 compares the tracking level values, to determine the highest tracking level. Then, the system controller 6 sets the output tracking data to the digital data corresponding to the above highest digital tracking level value, thus continually sustaining an optimized tracking condition.

Figure 3D:
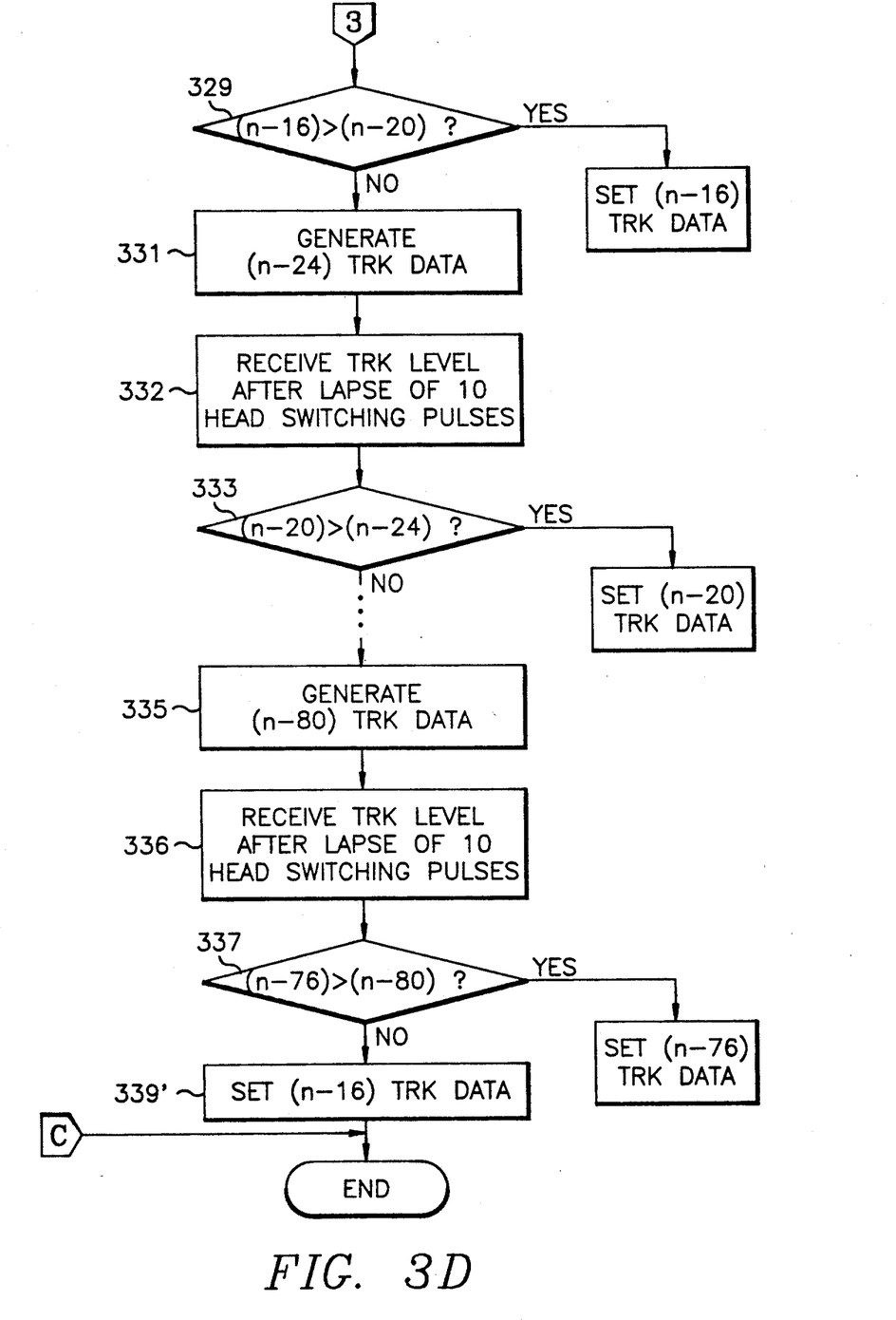

However, in step 326, if the tracking level values are not in the order of $S_6<S_7<S_8<S_9$, then the system controller 6 proceeds to step 339 to compare the tracking level values $S_1$-$S_9$ stored in the memory to detect the highest tracking level value. In the step 340, the system controller 6 sets the tracking data corresponding to the above highest tracking level value as the output tracking data.

It should be noted that the present invention is featured by the steps 339 and 340 in which the highest tracking level value can be detected even though the tracking level values are irregularly changed as shown with reference to the curves 403 and 404 of FIG. 4.

As described heretofore, the present invention monitors the variation of the tracking level to always detect the highest tracking level. Then, the tracking data corresponding to the highest tracking level value is set as the output tracking data, thus continually sustaining an optimized tracking condition.

The foregoing description shows only one preferred embodiment of the present invention. Various modifications are apparent to those skilled in the art without departing from the scope of the present invention which is only limited by the appended claims. Therefore, the embodiment shown and described is only illustrative, not restrictive.

What is claimed is:

1. A tracking control device for a video tape recorder, comprising:
- a system controller for generating tracking data of an initial one of a plurality of tracking data sets and for sequentially generating tracking data of tracking data sets succeeding said initial one until an instant digital tracking level value corresponding to said tracking data corresponds to a first predetermined one of said plurality of tracking data sets;
- a servo for generating a capstan control signal in response to said tracking data for controlling capstan rotation;
- a pick-up head for reading signals from a tape running in said video tape recorder and controlled by said capstan rotation;
- means for amplifying said signals read by said pick-up head and for selecting a desired tracking control signal from the amplified signals;
- means for integrating the desired tracking control signal selected to generate an instant tracking level;
- an analog-to-digital converter for converting said instant tracking level to said instant digital tracking level value corresponding to said tracking data;
- said system controller for sequentially storing in memory, every first time period after each said tracking data is generated, each said instant digital tracking level value corresponding to each said tracking data and determining whether each said instant digital tracking level value corresponds to said first predetermined one of said plurality of tracking data sets;
- said system controller determining whether each sequentially stored instant digital tracking level value is greater than each preceding stored instant digital tracking level value when one of said stored instant digital tracking level values does correspond to said first predetermined one of said plurality of tracking data sets;
- said system controller sequentially generating tracking data, for controlling said servo, of tracking data sets following said first predetermined one of said plurality of tracking data sets, if each said sequentially stored instant digital tracking level value is greater than each preceding stored instant digital tracking level value, and storing, after each second time period, each corresponding instant digital tracking level value as a result thereof; and
- said system controller controlling said servo with the tracking data of the tracking data set having the highest corresponding instant digital tracking level value, said highest corresponding instant digital tracking level value corresponding to one of said tracking data of said first predetermined one of said tracking data sets and said tracking data of one of said tracking data sets succeeding said first predetermined one of said tracking data sets.

2. The tracking control device as claimed in claim 1, further comprising:
- said system controller for generating, sequentially in descending order, the tracking data of tracking data sets preceding said initial one of said plurality of tracking data sets if each said sequentially stored instant digital tracking level value is not greater than each preceding stored instant digital tracking level value, and sequentially storing, after each third time period, corresponding instant digital tracking level values as a result thereof until one of said stored instant digital tracking level values, corresponding to said tracking data sets preceding said initial one of said tracking data sets, corresponds to a second predetermined one of said tracking data sets.

3. The tracking control device as claimed in claim 2, further comprising:
- said system controller sequentially generating, in descending order, tracking data of tracking data sets preceding said second predetermined one of said tracking data sets, if each said sequentially stored instant digital tracking level value corresponding to said tracking data sets preceding said initial one of said tracking data sets is greater than each preceding stored instant digital tracking level value, for controlling said servo, and storing, after each second time period, each corresponding instant digital tracking level value as a result thereof; and
- said system controller controlling said servo with the tracking data of the tracking data set having the highest corresponding instant digital tracking level value, said highest corresponding instant digital tracking level value corresponding to said tracking data of said second predetermined one of said tracking data sets or said tracking data of one of said tracking data sets preceding said second predetermined one of said tracking data sets.

4. The tracking control device as set forth in claim 3, wherein each said first time period is equal to 0.1 seconds, each said second time period is equal to 10 head switching pulses, and each said third time period is equal to 0.1 seconds.

5. The tracking control device as set forth in claim 3, further comprising:
- said system controller for controlling said servo with the tracking data of the tracking data set having the highest corresponding instant digital tracking level value of all said stored instant digital tracking level values if each said sequentially stored instant digital tracking level value stored during each first time period is not greater than each preceding stored instant digital tracking level value stored during each first time period and if each said sequentially stored instant digital tracking level value stored during each third time period is not greater than each preceding stored instant digital tracking level value stored during each third time period.

6. A method for controlling tracking in a video tape recorder, comprising the steps of:
- sequentially generating tracking data of a central one of a plurality of tracking data sets and of tracking data sets succeeding said central one until tracking data of a first predetermined one of said tracking data sets has been generated;
- generating a capstan control signal in response to said tracking data for controlling capstan rotation;
- reading signals from a tape running in said video tape recorder and controlled by said capstan rotation;
- providing amplified signals by amplifying said signals read and selecting a desired tracking control signal from said amplified signals;
- integrating the desired tracking control signal selected to generate an instant tracking level;
- converting said instant tracking level to an instant digital tracking level value corresponding to said tracking data;
- sequentially storing in memory, every first time period after each said tracking data is generated, each said instant digital tracking level value corresponding to each said tracking data and determining whether each stored instant digital tracking level value corresponds to said first predetermined one of said tracking data sets;

determining whether each sequentially stored instant digital tracking level value is greater than each preceding stored instant digital tracking level value when one of said stored instant digital tracking level values is determined to correspond to said first predetermined one of said tracking data sets;

sequentially generating tracking data, for generating a corresponding capstan control signal, of tracking data sets following said first predetermined one of said tracking data sets, if each said sequentially stored instant digital tracking level value is greater than each preceding stored instant digital tracking level value, and storing, after each second time period, each corresponding instant digital tracking level value as a result thereof; and controlling generation of said capstan control signal with the tracking data of the tracking data set having the highest corresponding instant digital tracking level value, said highest corresponding instant digital tracking level value, corresponding to one of said tracking data of said first predetermined one of said tracking data sets and said tracking data of one of said tracking data sets succeeding said first predetermined one of said tracking data sets.

7. The method as claimed in claim 6, further comprising the steps of:

sequentially generating, in descending order, the tracking data of tracking data sets preceding said central one of said plurality of tracking data sets if each said sequentially stored instant digital tracking level value is not greater than each preceding stored instant digital tracking level value; and sequentially storing, every third time period after generating each said tracking data of said preceding tracking data sets, corresponding instant digital tracking level values until one of said stored instant digital tracking level values stored after each said third time period corresponds to a second predetermined one of said tracking data sets.

8. The method as claimed in claim 7, further comprising the steps of:

sequentially generating, in descending order, tracking data of tracking data sets preceding said second predetermined one of said tracking data sets, if each said sequentially stored instant digital tracking level value stored after each said third time period is greater than each preceding stored instant digital tracking level value stored after each said third time period, for controlling generation of said capstan control signal, and storing, after each fourth time period, each corresponding instant digital tracking level value as a result thereof; and automatically controlling said generation of said capstan control signal with the tracking data of the tracking data set having the highest corresponding instant digital tracking level value, said highest corresponding instant digital tracking level value corresponding to said tracking data of said second predetermined one of said tracking data sets or said tracking data of one of said tracking data sets preceding said second predetermined one of said tracking data sets.

9. The method as set forth in claim 8, wherein each said first time period is equal to 0.1 seconds, each said second time period is equal to 10 head switching pulses, each said third time period is equal to 0.1 seconds, and each said fourth time period is equal to 10 head switching pulses.

10. The method as claimed in claim 8, wherein said step of automatically controlling said generation of said capstan control signal further comprises the steps of:

comparing, every said fourth time period, the stored corresponding instant digital tracking level value to the preceding stored instant digital tracking level value;

selecting said preceding stored instant digital tracking level value as said tracking data for automatically controlling said generation of said capstan control signal if said comparing step determines said preceding stored instant digital tracking level value is greater than the stored corresponding instant digital tracking level value;

selecting the tracking data of said second predetermined one of said tracking data sets for automatically controlling said generation of said capstan control signal after a third predetermined one of said tracking data sets is generated if said comparing step determines that each said stored corresponding instant digital tracking level value is greater than each said preceding stored instant digital tracking level value.

11. The method as set forth in claim 7, further comprising the steps of:

controlling generation of said capstan control signal with the tracking data of the tracking data set having the highest corresponding instant digital tracking level value of all said stored instant digital tracking level values if each said sequentially stored instant digital tracking level value stored after each first time period is not greater than each preceding stored instant digital tracking level value stored after each first time period and if each said sequentially stored instant digital tracking level value stored after each third time period is not greater than each preceding stored instant digital tracking level value stored after each third time period.

12. The method as set forth in claim 11, wherein each said first time period is equal to 0.1 seconds, each said second time period is equal to 10 head switching pulses, each said third time period is equal to 0.1 seconds.

13. The method as claimed in claim 6, wherein said step of controlling generation of said capstan control signal further comprises the steps of:

comparing, every second time period, the stored corresponding instant digital tracking level value to the preceding stored instant digital tracking level value;

selecting said preceding stored instant digital tracking level value as said tracking data for controlling said generation of said capstan control signal if said comparing step determines said preceding stored instant digital tracking level value is greater than the stored corresponding instant digital tracking level value;

selecting the tracking data of said first predetermined one of said tracking data sets for controlling said generation of said capstan control signal after a second predetermined one of said tracking data sets is generated if said comparing step determines that each said stored corresponding instant digital tracking level value is greater than each said preceding stored instant digital tracking level value.

* * * * *

UNITED STATES PATENT AND TRADEMARK OFFICE
CERTIFICATE OF CORRECTION

PATENT NO. : 5,311,381
DATED : 10 May 1994
INVENTOR(S) : Tack-Ho LEE

It is certified that error appears in the above-indentified patent and that said Letters Patent is hereby corrected as shown below:

Column 1,

Line 33,     after "variation", change "valves" to --values--;

Column 2,

Line 64     after "$S_1$", change " < " to -- > --:

Signed and Sealed this

Second Day of July, 1996

Attest:

BRUCE LEHMAN

Attesting Officer      Commissioner of Patents and Trademarks